United States Patent [19]
Holler et al.

[11] Patent Number: 4,643,356
[45] Date of Patent: Feb. 17, 1987

[54] COOLING LINER FOR CONVERGENT-DIVERGENT EXHAUST NOZZLE

[75] Inventors: Richard P. Holler, Palm Beach Gardens; Connie W. McMath, North Palm Beach, both of Fla.

[73] Assignee: United Technologies Corporation, Hartford, Conn.

[21] Appl. No.: 255,008

[22] Filed: Apr. 17, 1981

Related U.S. Application Data

[63] Continuation of Ser. No. 829,378, Aug. 31, 1977, abandoned.

[51] Int. Cl.[4] .............................................. B64D 33/08
[52] U.S. Cl. ....................................... 239/13; 60/265; 60/266; 239/127.3
[58] Field of Search .................................. 60/265-267; 239/127.1, 127.3, 265.39, 1, 8, 11, 13

[56] References Cited

U.S. PATENT DOCUMENTS

| 3,046,730 | 7/1962 | Petren | 239/265.39 |
| 3,595,023 | 7/1971 | Stockel | 239/127.3 X |
| 3,605,412 | 9/1971 | Stockel | 60/265 X |
| 3,979,065 | 9/1976 | Madden | 239/127.3 |

FOREIGN PATENT DOCUMENTS 74191  11/1960  France ........................ 239/265.39

Primary Examiner—Andres Kashnikow
Attorney, Agent, or Firm—Robert C. Walker

[57] ABSTRACT

A gas turbine exhaust nozzle capable of long term, reliable operation is disclosed. Nozzle cooling concepts specifically directed to convergent-divergent exhaust nozzles are developed. The exhaust nozzle disclosed has a cooling liner which is strategically positioned in the nozzle to take advantage of aerodynamic conditions along the axial length of the nozzle.

2 Claims, 3 Drawing Figures

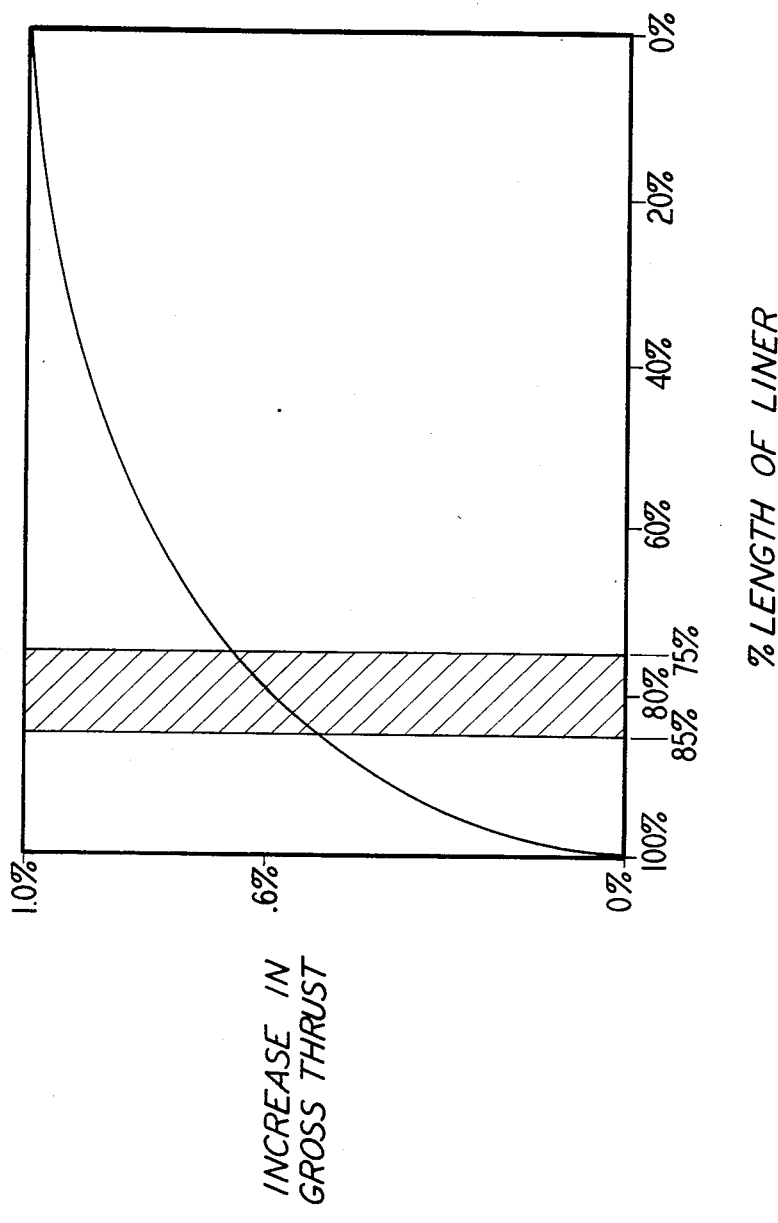

COOLING LINER FOR CONVERGENT-DIVERGENT EXHAUST NOZZLE

BACKGROUND OF THE INVENTION

The Government has rights in this invention pursuant to Contract No. F33657-70-C-0600 awarded by the Department of the Air Force.

This is a continuation of application Ser. No. 829,378 filed Aug. 31, 1977 now abandoned.

FIELD OF THE INVENTION

This invention relates to exhaust nozzles for gas turbine engines, and more particularly to cooling systems for convergent-divergent exhaust nozzles

DESCRIPTION OF THE PRIOR ART

In the past three decades the development and improvement of the gas turbine engine has been a dynamic force attracting the efforts of top scientists and engineers throughout the world. Sophisticated engineering teams have been formed and highly reliable, high performance products have been introduced at their direction. Notwithstanding the above success, creative ingenuity in the industry continues to abound as new improvements expand capabilities beyond former horizons.

Exhaust nozzles for gas turbine engines have taken many forms through the years in response to varying engine design parameters. With respect to high pressure ratio engines for supersonic aircraft, nozzles of the convergent-divergent type have proven to be the most efficient. In consideration of the hostile environment in which the nozzles must operate, intricate cooling systems have been devised to protect the structural elements of the nozzles from the high temperature gases passing therethrough.

The apparatus illustrated in U.S. Pat. No. 3,979,065 to Madden entitled "Cooling Liner for Exhaust Nozzle" is representative of exhaust nozzles in use today and is the closest prior art cooling system known. In Madden, as in the present invention, a cooling liner is disposed inwardly of the convergent section of the nozzle. Note particularly in Madden, however, that the cooling liner extends over the full length of the convergent section. Note also, that the cooling medium passing beneath the liner is carried to the throat region, or directly downstream thereof, before the medium is discharged to the engine exhaust stream.

Both structural and functional departures from this prior art are developed in the disclosure of the invention which follows.

SUMMARY OF THE INVENTION

A primary objective of the present invention is to provide an improved cooling system for a convergent-divergent exhaust nozzle. The avoidance of energy dissipation in the cooling medium flow is sought and a collateral objective is increased durability of the nozzle components through the judicious, yet effective use of cooling air.

According to the present invention a cooling liner is disposed radially inward of the convergent flaps in the upstream portion of a convergent-divergent nozzle and is adapted to discharge cooling medium flowing therethrough into the convergent section of the nozzle upstream of the throat.

A primary feature of the present invention is the convergent-divergent nozzle. A cooling liner in the nozzle extends over the initial portion of the convergent region and terminates upstream of the nozzle throat. Cooling medium from the nozzle liner is discharged so as to flow downstream over the throat and into the divergent section of the nozzle.

A principle advantage of the present invention is improved cooling of the exhaust nozzles as convective cooling and film cooling are combined to make judicious use of limited amounts of cooling air. The upstream portion of the convergent section is convectively cooled by the cooling medium as it is passed beneath the cooling liner. The downstream portion of the convergent section, the nozzle throat, and the divergent section are film cooled by the cooling medium after it is discharged from the cooling flow. Collaterally, engine thrust is increased by the measure of reduced flow losses under the cooling liner as choked flow under the liner is avoided.

The foregoing, and other objects, features and advantages of the present invention will become more apparent in the light of the following detailed description of the preferred embodiment thereof as shown in the accompanying drawing.

BRIEF DESCRIPTION OF THE DRAWING

FIG. 3 is a graph illustrating the relationship between liner length and engine thrust.

DESCRIPTION OF THE PREFERRED EMBODIMENT

Figure 1:
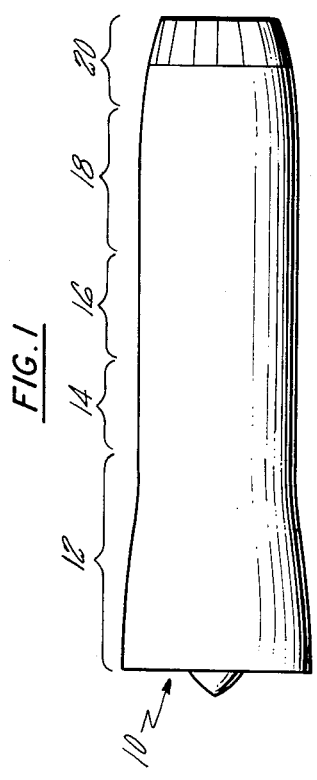
FIG. 1 is a simplified side elevation view of a gas turbine engine having afterburner and exhaust nozzle sections.
Figure 2:
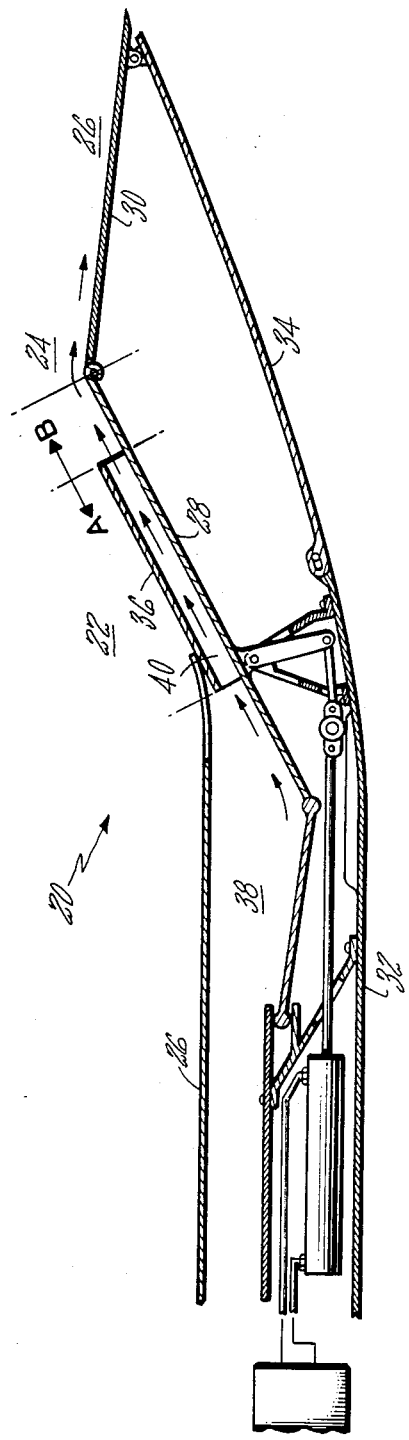
FIG. 2 is a simplified partial section view taken through the exhaust nozzle section of the engine.

The gas turbine engine 10 illustrated in FIG. 1 has as principle sections: a compressor section 12; a combustion section 14; a turbine section 16; an augmentor, or afterburner section 18, and an exhaust nozzle section 20. The exhaust nozzle section is illustrated in more detailed form in the FIG. 2 partial cross section view.

The exhaust nozzle is of the convergent-divergent type having a convergent region 22, a throat region 24, and a divergent region 26. The convergent region is further divided into an upstream portion A and a downstream portion B.

The inner wall of the exhaust nozzle is formed of an exhaust duct 26, convergent flaps as represented by the single flap 28, and divergent flaps as represented by the single flap 30. The outer wall of the exhaust nozzle is formed of an engine case 32 and external flaps as represented by the single flap 34. A cooling liner 36 is spaced apart from the convergent flaps 28 and extends over the upstream portion A of the convergent flaps. The geometry of the nozzle, as defined by the various flaps, is controlled by levers and actuators pictorially illustrated in FIG. 2.

Means for cooling the inner wall of the exhaust nozzle is provided. Cooling air, such as from the fan stream in most embodiments known today, is flowable to an annulus 38 adjacent the exhaust duct 26. The air is subsequently flowable to a space 40 between each convergent liner 36 and the corresponding convergent flap 28. Air traversing the space convectively cools the liner and the upstream portion A of the convergent flap. Cooling air discharging from the space 40 forms a protective barrier of air over the downstream portion B of the convergent flap to film cool the downstream portion. The protective film continues to adhere to the inner wall of the exhaust nozzle in the throat region 24 and also substantially adheres to the divergent flap 30 as illustrated by the arrows in FIG. 2 of the drawing.

In the practice of the present invention it is desired that static pressure ($P_S$) of the cooling medium at the point of discharge from the liner be substantially equal to the static pressure of the engine exhaust flow at that point. A greater static pressure of the cooling medium causes the discharge flow to be expanded into the lower pressure exhaust flow and a decreased tendency of the cooling flow to adhere to the inner walls of the nozzle results. A lesser static pressure of the cooling medium causes the thickness of the discharge flow to be diminished as the higher pressure exhaust flow is expanded into the cooling air.

The static pressure of the engine exhaust flow and the static pressure of the cooling medium are calculable in accordance with the known formula shown below.

$$P_S = P_T / \left(1 + \frac{K-1}{2} M^2\right)^{\frac{K}{K-1}}$$

where
$P_S$ is the static pressure at a given point;
$P_T$ is the total pressure at the given point:
K is the ratio of specific heats of the fluid medium; and
M is the Mach Number of the fluid medium at the given point.

The total pressure ($P_T$) of the engine exhaust flow at the point of cooling medium discharge from the cooling liner 36 is determinable by well known practices from tables of isentropic flow. The total pressure ($P_T$) of the cooling flow at the point of discharge from the liner is largely dependent upon expansion, contraction and skin friction losses imposed upon the medium as it passes beneath the liner. In constructions where the axial pressure differential across the liner is large, as for example in nozzles discharging the cooling flow to the exhaust stream at the point of low static pressure in the nozzle throat, the Mach Number of the cooling medium is high and the flow losses are large. Flow under the liner may even become choked under adverse conditions. The imposition of high flow losses resultantly depletes energy from the cooling stream which would otherwise be additive as a constituent of total thrust.

Although the available thrust constituent dissipated in cooling flow losses is by appearances of minor magnitude, this thrust lost in former structures, such as that illustrated by the Madden patent, is near totally recoverable. The graph of FIG. 3 is based upon actual test results comparing, as data points, the Madden structure and the cut-back cooling liner of the present invention. As is illustrated the thrust penalty imposed by a liner extending into the nozzle throat, such as Madden, is approximately one percent (1%) of total engine thrust. Applying the concepts of the present invention, sixty percent (60%) of the lost thrust or six-tenths percent (0.6%) of total engine thrust is recovered.

Tests have revealed that the cooling effectiveness of the cooling medium in the divergent section of the nozzle is improved in the present structure and adequate cooling with even reduced amounts of cooling air has been achieved. Collaterally, film cooling in the throat region of the nozzle has been found superior to the former convective cooling in the region and the durability of the components in the throat region has been improved.

It has been determined that a liner covering approximately eighty percent (80%) of the axial length of the convergent flaps 28 is optimum and constructions ranging from seventy-five percent (75%) to eighty-five percent (85%) are considered to produce highly effective results. Constructions outside the above range are likely to be less effective although such remain within the scope of the present invention to the extent that beneficial results are obtainable.

It is contemplated that the flow area (A) under the liner need be increased with a corresponding decrease in liner length. As the length is decreased the axial pressure differential across the liner is also decreased. As is explained above decreasing the axial pressure differential decreases the Mach Number of the fluid, and correspondingly the velocity of the fluid. To maintain an equivalent flow rate (W) at the reduced velocity, the flow area (A) must be increased. The geometric perturbation into the exhaust flow caused by a liner having increased flow area (A) imposes a physical limitation on the extent to which the liner may be cut back. For liners within the preferred range, no adverse aerodynamic effects are anticipated.

Although the invention has been shown and described with respect to preferred embodiments thereof, it should be understood by those skilled in the art that various changes and omissions in the form and detail thereof may be made therein without departing from the spirit and the scope of the invention.

Having thus described typical embodiments of our invention, that which we claim as new and desire to secure by Letters Patent of the United States is:

1. A method for recovering the energy of working medium gases compressed in the compression section of a gas turbine engine and utilized to cool a convergent-divergent exhaust nozzle in such an engine, comprising the steps of:
    flowing the working medium gases from the compression section to the convergent section of the convergent-divergent exhaust nozzle;
    passing said working medium beneath a liner in the upstream region of the convergent section to cool the exhaust nozzle; and
    discharging said working medium from the liner into the engine exhaust flow at the convergent section upstream of the nozzle throat at a point at which the static pressure of the working medium under the liner is substantially equal to the static pressure of the exhaust flow.

2. The method of claim 1 wherein the step of discharging the working medium from the liner includes the step of discharging the medium from the liner at a point at approximately eighty percent (80%) of the convergent section length.

* * * * *